April 3, 1934.  T. C. MOORSHEAD  1,953,427
METHOD OF AND MEANS FOR FEEDING RAW MATERIAL TO GLASS MELTING FURNACES
Filed Aug. 15, 1933
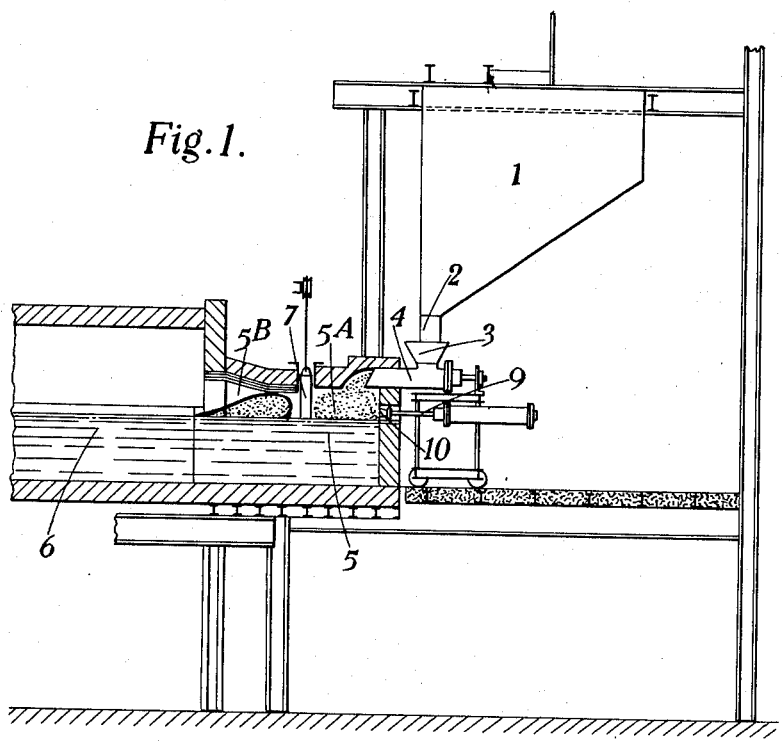
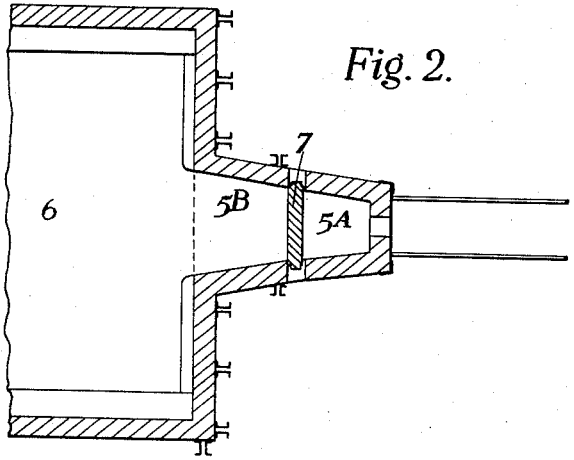
INVENTOR:
Thomas Courtney Moorshead
BY
ATTORNEY Patented Apr. 3, 1934

1,953,427

UNITED STATES PATENT OFFICE 1,953,427

METHOD OF AND MEANS FOR FEEDING RAW MATERIAL TO GLASS MELTING FURNACES

Thomas Courtney Moorshead, Strand, London, England, assignor to The United Glass Bottle Manufacturers Limited, Strand, London, England, a British Company Application August 15, 1933, Serial No. 685,270
In Great Britain August 1, 1933

9 Claims. (Cl. 49—54)

This invention relates to methods of and means for feeding raw material, known as batch, to glass melting furnaces.

The existing types of batch feeders possess various disadvantages arising inter alia out of the fact that they feed the raw batch directly into the back of the furnace in the form of a ribbon or stream which floats on the top of the molten glass and has a tendency to spread over the full surface of the mass of glass in the furnace. As will be apparent to those skilled in the art of glass making, this is a disadvantage inasmuch that, due to the unmelted batch floating on the surface towards the working end, there is danger of the glass at the working end not being properly fused and refined. Another disadvantage is that the light constituents of the batch which are in the form of dust, are caught up in the flames which blow it into the checker work of the regenerators. This dust has a great corroding and fluxing action on the checker work and also on the bricks forming the side wall and the crown of the furnace with the result that these bricks wear out or melt more quickly than otherwise would be the case. Again the melting of the checker work bricks tends to clog up the checker works.

It is well known that batch fed into a furnace in lumps or masses does not float down the furnace but remains substantially where it is placed until melted down, due to the fact that part of the pile or lump is submerged and is brought into contact with the colder glass below the surface which has a tendency to stick to the pile and prevents the lump floating down the furnace, and although this method of feeding in lumps overcomes one of the disadvantages of the previous methods of feeding, it does not overcome the other disadvantage above referred to. That is to say, before the surface of the batch pile has had chance to fuse the lighter constituents thereof which are chiefly alkalies catch up in the flames and, as previously stated, cause corrosion of the brickwork and other parts of the furnace. Moreover as these alkalies are the most expensive raw materials forming the batch, allowance has to be made for a certain loss of these materials.

The chief object of the present invention is to provide an improved method of feeding batch into a glass melting furnace by which the disadvantages referred to above can be overcome.

With this object in view the invention consists in an improved method of feeding raw material or batch to a glass melting furnace wherein the raw material is introduced into one end or the back of the furnace or a feeding compartment provided thereat, in the form of a pile or lump and in such a manner that the surface of the latter is subjected to the heat of the furnace prior to being introduced into the furnace proper and prior to being brought into the path of the flames whereby the aforesaid surface is fused before being introduced into the furnace proper.

The invention also consists in a method of feeding raw material or batch to glass melting furnaces which comprises forming a pile of batch in a compartment provided at but separated from the back of the furnace, transferring the pile into another compartment exposed to the heat of the furnace but not in the furnace proper whereby the surface of the pile becomes fused and then transferring the pile with a fused surface into the furnace proper.

The invention further consists in a glass melting furnace provided at the back or batch feeding end thereof with a forehearth or chamber extending outwardly therefrom and divided above the glass level and by an adjustable damper or gate, into a pile forming compartment and a pile surface fusing compartment, means for feeding batch into the former compartment and means for transferring the batch in pile form from the pile forming compartment to the pile surface fusing compartment.

In order that the said invention may be clearly understood and readily carried into effect, the same will now be more fully described with reference to the accompanying drawing in which:—

Fig. 1 is a vertical sectional view through the back or batch feeding end of a glass melting furnace adapted for the carrying out of the invention; and Fig. 2 is a plan view of the feeding end shown in Fig. 1.

Referring to the accompanying drawing in detail, 1 is a batch storage bin having, at its lower end, a spout 2 for delivering batch into a hopper 3 which, in turn, supplies the batch to a batch feeding device consisting of a circular trough or tube 4 enclosing a spiral conveyor or other suitable form of feeding means. The conveyor may be driven by any suitable means, such as an electric motor, which may be connected thereto by a chain and sprocket arrangement.

The aforesaid feeding device is arranged so that it delivers the batch to a forehearth or chamber 5 extending outwardly from the back of the furnace 6, which forehearth is divided above the glass level into two compartments 5A and 5B by an adjustable damper or gate 7 provided with suitable means for enabling same to be raised and lowered. The compartment 5A constitutes what may be termed "a pile forming compartment" and the compartment 5B constitutes what may be termed "a pile surface fusing compartment", it being observed that the latter is in direct communication with the furnace proper so that a pile of batch located within such compartment will be subjected to the heat of the furnace without being brought into direct contact with the furnace flames. Located a short distance below the feeding device 4 is a pile pushing device 10 connected by a horizontally disposed rod 9 to a reciprocating plunger contained in a cylinder 8, the said plunger being adapted to be operated hydraulically, or by air, steam, electric power or other means suitable for the purpose.

In operation, the damper or gate 7 is maintained closed as shown in the drawing whilst the aforesaid feeding device is feeding batch into the pile forming compartment 5A. When the batch being fed into this compartment forms therein a pile of a size sufficient to prevent same floating down the furnace, the damper or gate is raised and the pile pushing device is brought into operation to force the batch pile from the compartment 5A into the compartment 5B after which the damper is again lowered and a further charge of batch is delivered to the pile forming compartment.

As mentioned above, the compartment 5B is exposed to the heat of the furnace without being in the furnace proper or in the path of the furnace flames with the result that the surface of the batch pile introduced into this compartment becomes fused so that, when the next pile is pushed from compartment 5A into compartment 5B, the batch introduced into the furnace proper from the latter compartment will be in the form of a pile or lump having a fused surface. In this manner, the risk of the lighter constituents of the batch being caught up by the furnace flames or of causing corrosion is eliminated or reduced to a minimum and, since the aforesaid fused surface is produced without the aid of auxiliary or extraneous heating devices, the invention also results in a more efficient utilization of the heat available. After being introduced into the furnace proper, the batch pile gradually melts down, remaining near the back end of the furnace until it is completely melted.

Having thus described this invention what I claim as new therein and desire to secure by Letters Patent, is:—

1. A method of feeding raw material to glass melting furnaces which comprises the steps of introducing the material into a feeding compartment provided at the back end of the furnace, in the form of a pile so that the surface thereof is exposed to the heat of the furnace prior to being introduced into the furnace proper and prior to being brought into the path of the furnace flames and, when the aforesaid surface is fused, transferring the pile into the furnace proper.

2. A method of feeding raw material to glass melting furnaces which comprises forming a pile of batch in a compartment provided at but separated from the back of the furnace, transferring the pile into another compartment exposed to the heat of the furnace but not in the furnace proper whereby the surface of the pile becomes fused and then transferring the pile with the fused surface into the furnace proper.

3. A method of feeding raw material to glass melting furnaces which comprises forming a pile of batch in a compartment provided at but separated from the back of the furnace, moving the pile bodily from the said compartment into a contiguous compartment exposed to the heat of the furnace but not in the furnace proper whereby the surface of the pile becomes fused and then bodily transferring the pile with the fused surface into the back end of the furnace proper.

4. A method of feeding raw material to glass melting furnaces which comprises forming a pile of batch in a compartment provided at but separated from the back of the furnace by a vertically movable damper, raising the damper, pushing the pile bodily and in a horizontal direction from the said compartment into a contiguous compartment exposed to the heat of the furnace but not in the furnace proper whereby the surface of the pile becomes fused and then transferring the pile with the fused surface into the furnace proper.

5. A method of preventing batch dust being caught up in the flames of a glass melting furnace which comprises forming a pile of batch, subjecting the surface of the said pile to the heat of the furnace prior to being introduced into the furnace proper and until the surface of the pile becomes fused and then transferring the pile with its fused surface into the furnace proper.

6. A glass melting furnace provided at the batch feeding end thereof with a forehearth extending outwardly therefrom and divided, above the glass level, into a pile forming compartment and a pile surface fusing compartment, means for feeding batch into the pile forming compartment and means for transferring the batch in pile form from the pile forming compartment to the pile surface fusing compartment.

7. A glass melting furnace provided at the feeding end thereof with a forehearth extending outwardly therefrom, said forehearth being divided by an adjustable damper into a pile forming compartment and a pile surface fusing compartment, means for feeding raw material into the pile forming compartment and a horizontally reciprocatable pile pushing member disposed at the rear end of the pile forming compartment for transferring batch piles to the pile surface fusing compartment.

8. A glass melting furnace provided at the batch feeding end thereof with a forehearth extending outwardly therefrom, a damper dividing the forehearth above the glass level into a pile forming compartment and a pile surface fusing compartment, means for raising and lowering the said damper, a batch hopper, means for feeding batch from the hopper to the pile forming compartment and a batch pile displacing member disposed at the rear end of the pile forming compartment to the pile surface fusing compartment and from the latter to the furnace.

9. A glass melting furnace provided at the batch feeding end thereof with a forehearth extending outwardly therefrom, adjustable means dividing the forehearth into a batch pile forming compartment separated from the furnace proper and a batch pile surface fusing compartment exposed to the heat of the furnace but not in the furnace proper, a batch hopper, a conveyor for feeding batch from the hopper to the pile forming compartment and a horizontally reciprocatable pile pushing member disposed below the feeding conveyor for transferring batch piles from the pile forming compartment to the pile surface fusing compartment and from the latter to the furnace proper.

THOMAS COURTNEY MOORSHEAD.